US012699063B2

(12) United States Patent
Sun et al.

(10) Patent No.: US 12,699,063 B2
(45) Date of Patent: Aug. 4, 2026

(54) FOREIGN OBJECT HEIGHT MEASUREMENT METHOD AND CHARGED PARTICLE BEAM DEVICE

(71) Applicant: Hitachi High-Tech Corporation, Tokyo (JP)

(72) Inventors: Wei Sun, Tokyo (JP); Naomasa Suzuki, Tokyo (JP); Nobuhiro Okai, Tokyo (JP); Keiichiro Hitomi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 280 days.

(21) Appl. No.: 18/708,615

(22) PCT Filed: Jan. 26, 2022

(86) PCT No.: PCT/JP2022/002804
§ 371 (c)(1),
(2) Date: May 9, 2024

(87) PCT Pub. No.: WO2023/144909
PCT Pub. Date: Aug. 3, 2023

(65) Prior Publication Data
US 2025/0003898 A1 Jan. 2, 2025

(51) Int. Cl.
*G01N 23/22* (2018.01)
*G01B 15/02* (2006.01)
(Continued)

(52) U.S. Cl.
CPC ......... *G01N 23/2251* (2013.01); *G01B 15/02* (2013.01); *G06T 7/0004* (2013.01);
(Continued)

(58) Field of Classification Search
CPC ......... G01N 23/2251; G01N 2223/401; G01B 15/02; G06T 7/0004; G06T 7/60; G06T 2207/30148
See application file for complete search history.

(56) References Cited

U.S. PATENT DOCUMENTS 6,353,222 B1    3/2002  Dotan
2004/0188611 A1  9/2004  Takeuchi et al.
(Continued)

FOREIGN PATENT DOCUMENTS

JP    2004-214060 A    7/2004
JP    2007-129059 A    5/2007
(Continued)

OTHER PUBLICATIONS

International Search Report of PCT/JP2022/002804 dated Apr. 19, 2022.

*Primary Examiner* — Nicole M Ippolito
(74) *Attorney, Agent, or Firm* — MATTINGLY & MALUR, PC

(57) ABSTRACT

A foreign object height measurement method including: storing in advance dependence data indicating a dependence of a calculated value of the height of the foreign object calculated from a foreign object image extracted from the charged particle image on an orientation of the foreign object; extracting a measurement target foreign object image, being a image of a measurement target foreign object, from the charged particle image; and outputting a measurement value of a height of the measurement target foreign object along with a warning regarding reliability or measuring the height of the measurement target foreign object from a charged particle image acquired by rotating the sample stage and changing an orientation of the measurement target foreign object detected from the measurement target foreign object image when it is determined that the (Continued)

orientation of the measurement target foreign object does not satisfy an acceptable error range based on the dependence data.

15 Claims, 9 Drawing Sheets

(51) Int. Cl.
  *G01N 23/2251* (2018.01)
  *G06T 7/00* (2017.01)
  *G06T 7/60* (2017.01)
(52) U.S. Cl.
  CPC .......... *G06T 7/60* (2013.01); *G01N 2223/401* (2013.01); *G06T 2207/10061* (2013.01); *G06T 2207/30148* (2013.01)

(56) References Cited

U.S. PATENT DOCUMENTS

| | | | |
|---|---|---|---|
| 2007/0105243 A1 | 5/2007 | Nagatomo et al. | |
| 2008/0239266 A1* | 10/2008 | Noboru .............. | G03F 7/70191 |
| | | | 430/5 |
| 2013/0230805 A1* | 9/2013 | Yamaguchi ......... | H01J 37/3174 |
| | | | 430/296 |
| 2020/0312605 A1* | 10/2020 | LeGrove ................. | H01J 37/20 |
| 2022/0130027 A1 | 4/2022 | Fukuda et al. | |

FOREIGN PATENT DOCUMENTS

| | | | |
|---|---|---|---|
| WO | 2020/157860 A1 | 8/2020 | |
| WO | 2020/166076 A1 | 8/2020 | |

* cited by examiner

[FIG. 1]
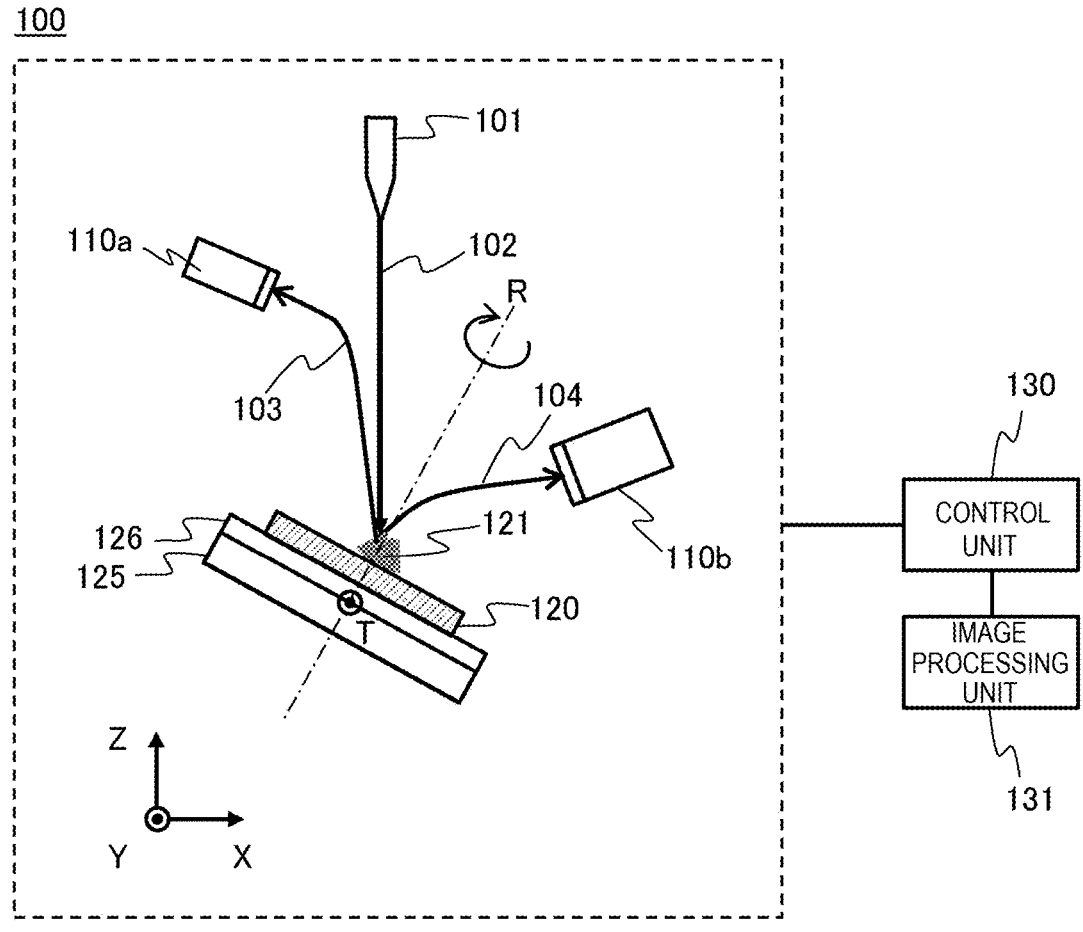
[FIG. 2]
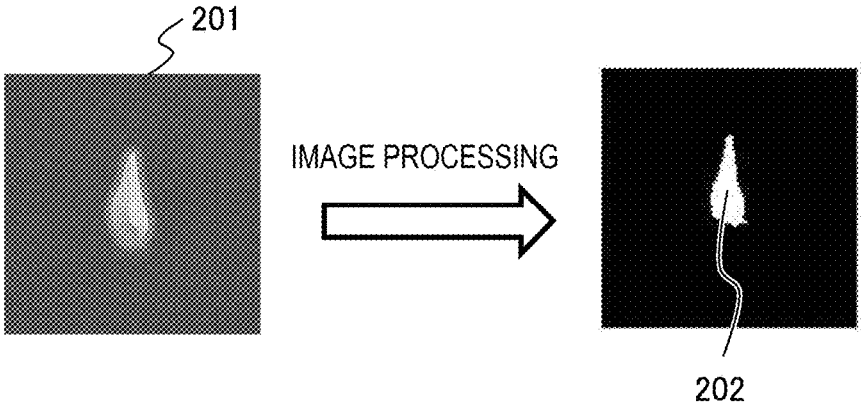
IMAGE PROCESSING

[FIG. 3]
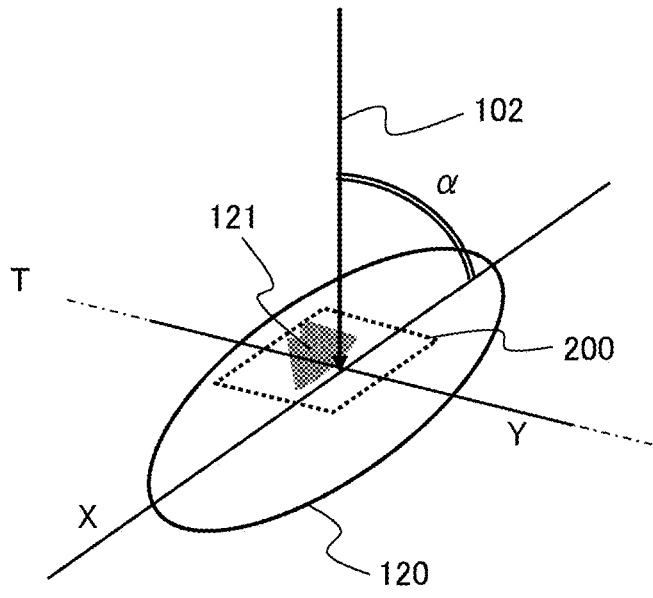
[FIG. 4A]
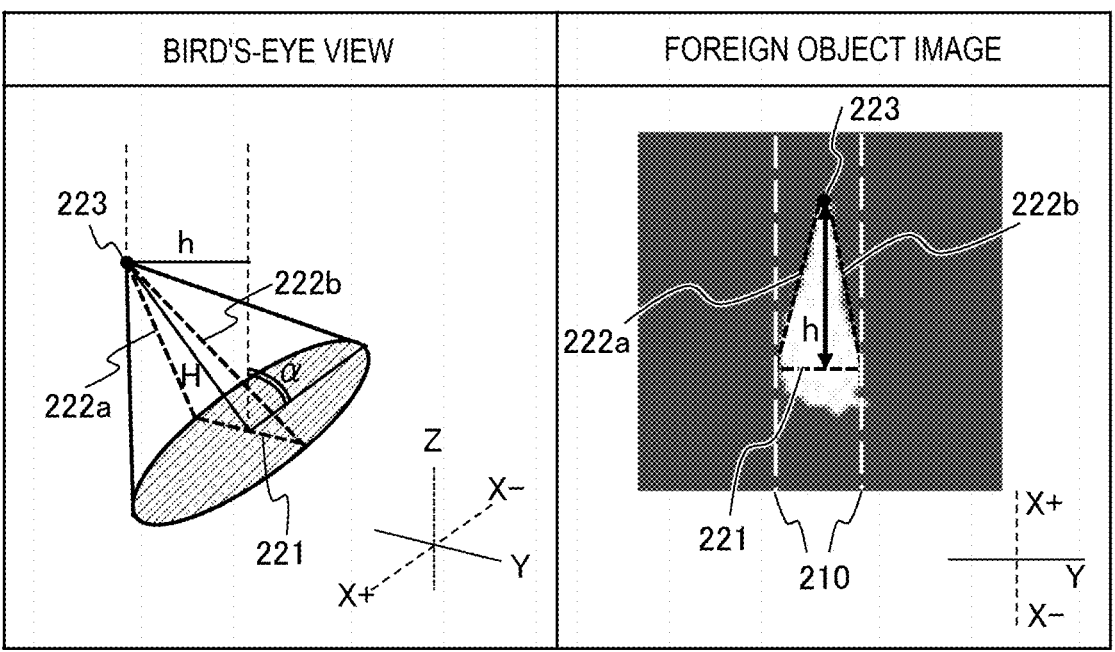

[FIG. 4B]
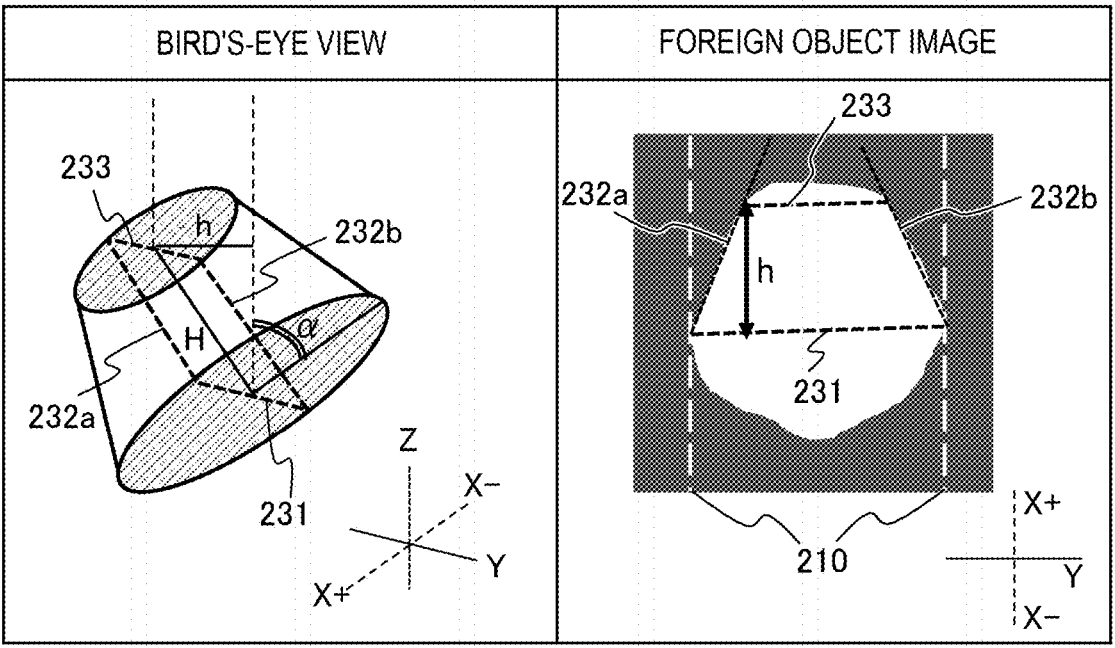
[FIG. 5]
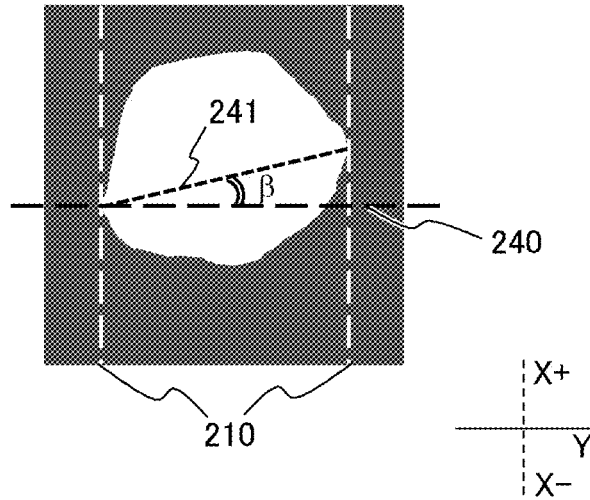

[FIG. 6]
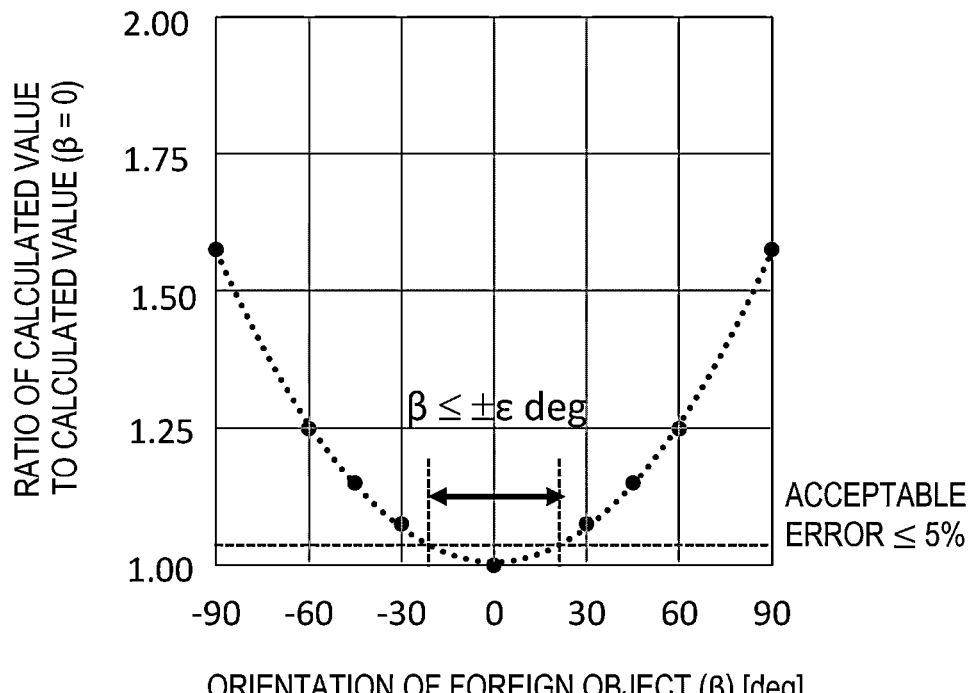
ORIENTATION OF FOREIGN OBJECT (β) [deg]

[FIG. 7]
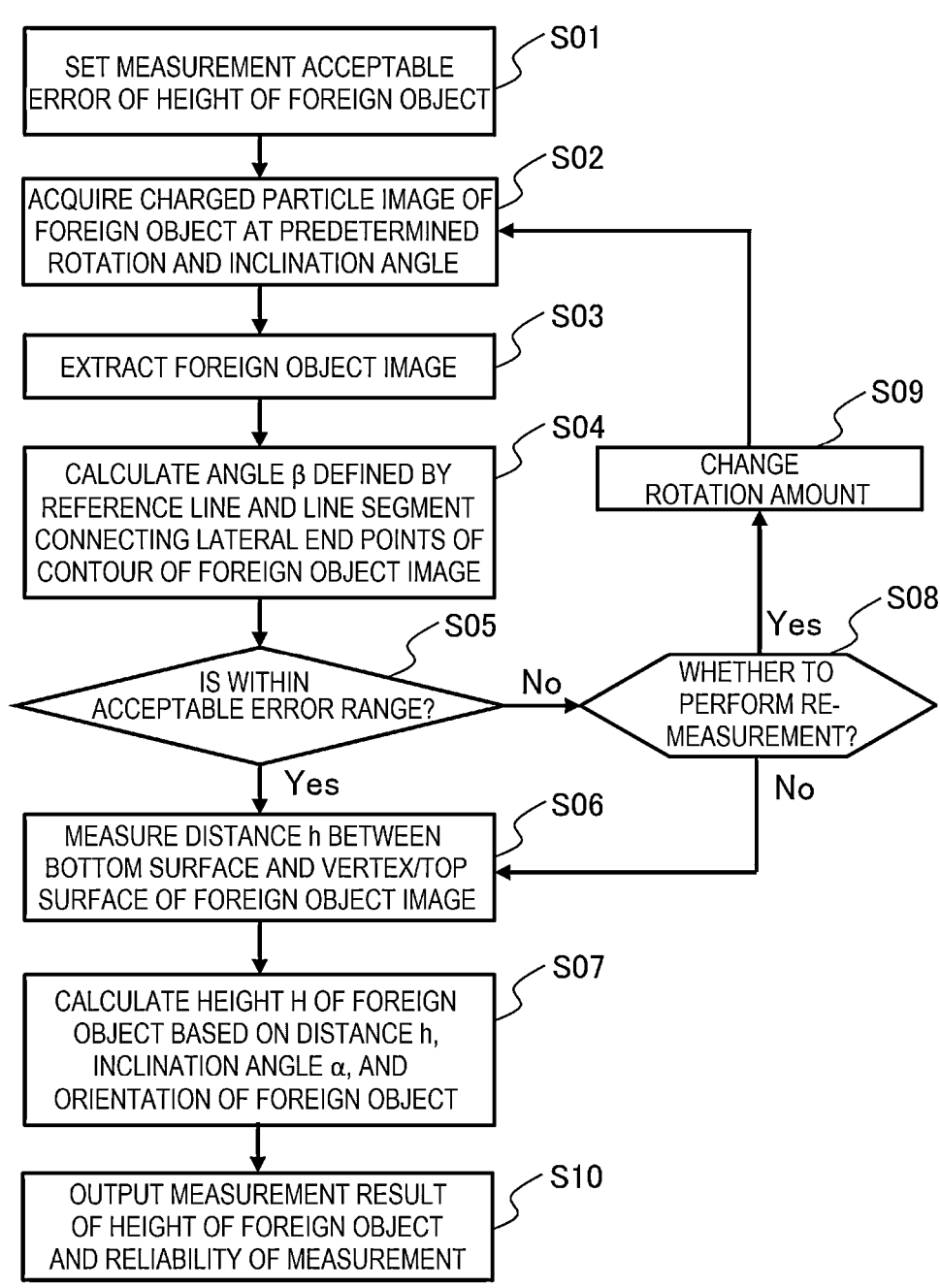

[FIG. 8A]
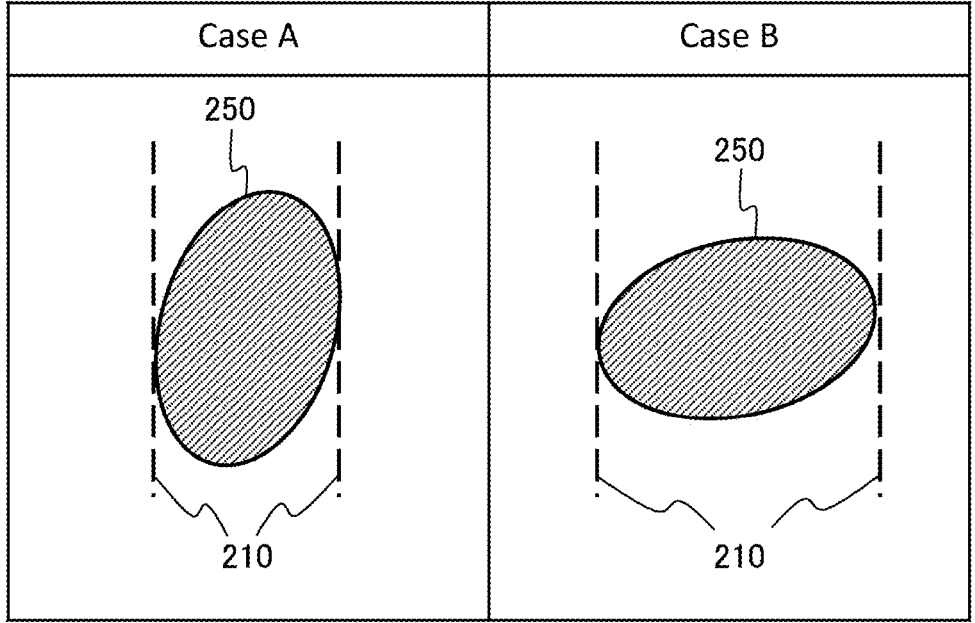
[FIG. 8B]
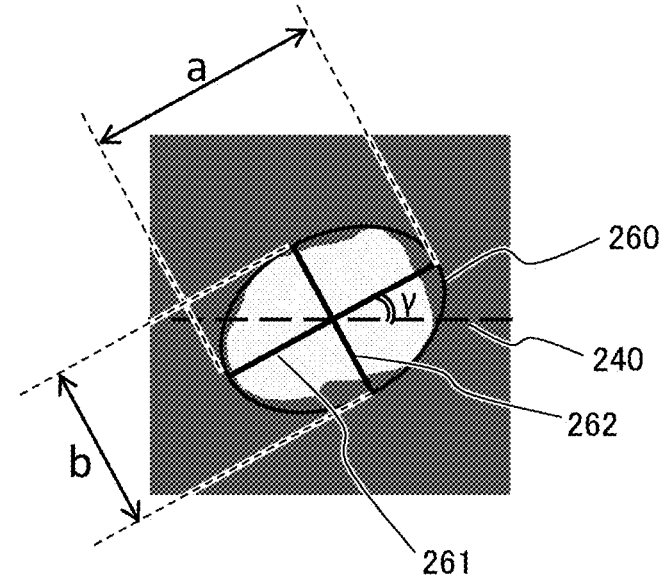

[FIG. 9]
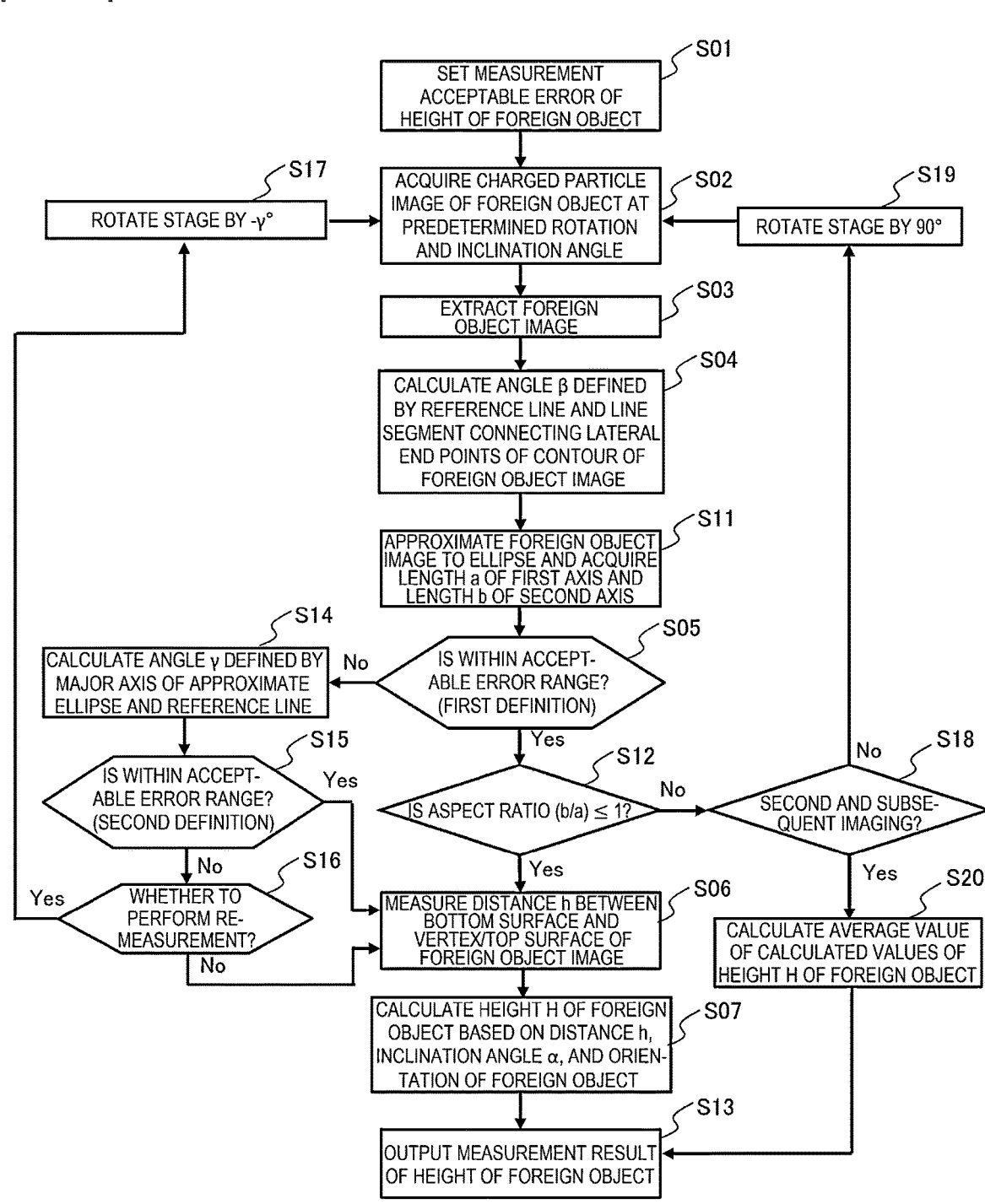

[FIG. 10]
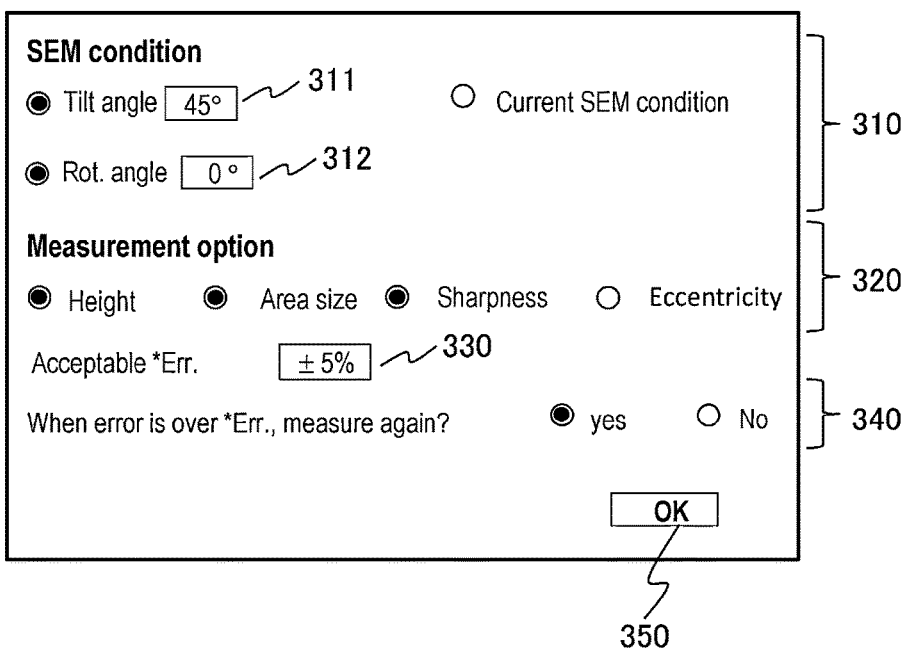
300
[FIG. 11]
400
| Image list | MEASUREMENT ITEM | | | MEASUREMENT RELIABILITY | ESTIMATED VALUE (nm) | Note |
|---|---|---|---|---|---|---|
| | HEIGHT (nm) | ORIENTATION (deg) | AREA (μm²) | | | |
| xxx_01.tif | 300 | 3 | 0.96 | HIGH | 300 | |
| xxx_02.tif | 270 | 65 | 1.2 | LOW | 210 | Rot. = -65 deg |
| xxx_03.tif | NA | NA | NA | NA | NA | Seg. failed |
| ... | | | | | | |
401    402    403    404    405    406    407

[FIG. 12]
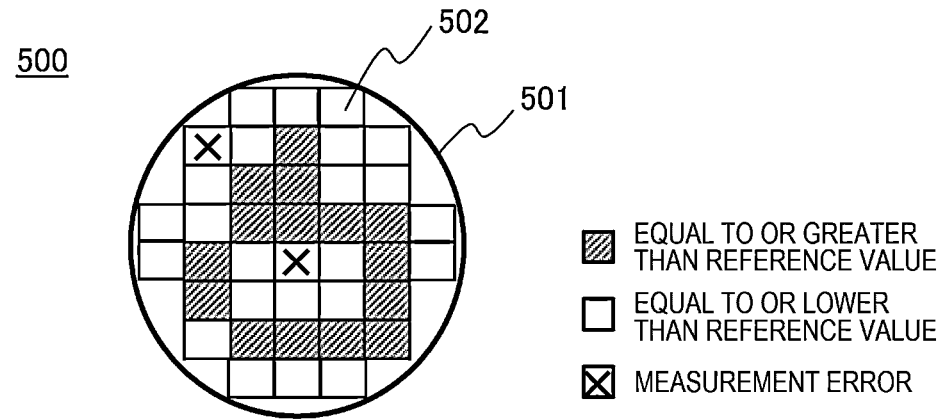

FOREIGN OBJECT HEIGHT MEASUREMENT METHOD AND CHARGED PARTICLE BEAM DEVICE

TECHNICAL FIELD

The present invention relates to a foreign object height measurement method and a charged particle beam device.

BACKGROUND ART

Patent Literature 1 discloses that a stereoscopic scanning electron microscopy (SEM) image signal is created by combining two SEM image signals captured from different viewpoints, and a depth of a defect on a wafer is determined.

CITATION LIST

Patent Literature

PTL 1: U.S. Pat. No. 6,353,222B

SUMMARY OF INVENTION

Technical Problem

In a manufacturing process of a semiconductor device, etching processing is applied to form a pattern of electrodes, wirings, vias, and the like constituting a device on a semiconductor wafer. After the etching processing, foreign objects (etching residues) of various shapes generated during the etching processing remain on the semiconductor wafer. Here, when a height, size, or the like of the foreign object remaining on the semiconductor wafer is equal to or greater than a predetermined value, an initial failure or a deterioration in life of the manufactured semiconductor device occurs, which causes a decrease in yield. Therefore, a technique of measuring the height of the foreign object on the semiconductor wafer is important for process management and a screening inspection for the initial failure in a mass production process.

In Patent Literature 1, it is possible to measure a height or a depth of a defect from a stereoscopic SEM image. However, in order to obtain the stereoscopic SEM image, it is necessary to acquire SEM images from a plurality of viewpoints and perform image processing, and a throughput is low. In particular, in order to measure heights of a large number of foreign objects in a mass production process, a technique for measuring the height of the foreign object on the semiconductor wafer with high throughput is required.

Solution to Problem

A foreign object height measurement method, which is an embodiment of the invention, is a foreign object height measurement method for measuring a height of a foreign object on a sample from a charged particle image acquired by irradiating the sample with a charged particle beam in a state where a sample stage on which the sample is placed is inclined, the measurement method including:

storing in advance dependence data indicating a dependence of a calculated value of the height of the foreign object calculated from a foreign object image, which is an image of the foreign object extracted from the charged particle image, on an orientation of the foreign object;

extracting a measurement target foreign object image, which is an image of a measurement target foreign object, from the charged particle image; and outputting a measurement value of a height of the measurement target foreign object along with a warning regarding reliability or measuring the height of the measurement target foreign object from a charged particle image acquired by rotating the sample stage and changing an orientation of the measurement target foreign object detected from the measurement target foreign object image when it is determined that the orientation of the measurement target foreign object does not satisfy an acceptable error range based on the dependence data, in which the orientation of the foreign object is defined by an angle defined by a longest line segment among line segments that connect contact points between a contour of the foreign object image and inclination direction lines, which are two parallel straight lines extending in an inclination direction of the sample stage, and a reference line perpendicular to the inclination direction line.

Advantageous Effects of Invention

The height of the foreign object on the sample can be measured with high throughput.

Other problems and novel features will become apparent from the description of this specification and the accompanying drawings.

BRIEF DESCRIPTION OF DRAWINGS

FIG. 1 is a configuration example of a charged particle beam device.

FIG. 2 is a diagram showing how a foreign object image is extracted from a SEM image.

FIG. 3 is a diagram showing a positional relation between a sample and an electron beam when the SEM image is captured.

FIG. 4A is a diagram showing a bird's-eye view of a conical foreign object when the SEM image is acquired, and a foreign object image extracted from the SEM image.

FIG. 4B is a diagram showing a bird's-eye view of a foreign object having a tapered cylindrical shape when the SEM image is acquired, and a foreign object image extracted from the SEM image.

FIG. 5 is a diagram showing a first definition of an orientation of the foreign object.

FIG. 6 is a diagram showing a dependence of a calculated value of the height of the foreign object on the orientation of the foreign object.

FIG. 7 is a flowchart for measuring the height of the foreign object.

FIG. 8A is an example in which the orientation of the foreign object is different.

FIG. 8B is a diagram showing a second definition of the orientation of the foreign object.

FIG. 9 is a flowchart for measuring the height of the foreign object.

FIG. 10 is an example of a GUI screen for setting measurement conditions.

FIG. 11 is an example of a data structure of measurement data.

FIG. 12 is an example of a wafer heat map.

DESCRIPTION OF EMBODIMENTS

FIG. 1 shows a configuration example of a charged particle beam device for measuring a height of a foreign object on a semiconductor wafer. Here, a scanning electron microscope that generates an image based on signal electrons emitted from a surface of a sample by scanning an electron beam on the sample will be described as an example. The scanning electron microscope 100 includes elements that constitute a general scanning electron microscope, such as an electron optical system, a stage mechanism system, a detection system, a control system, and a signal processing system, as main configurations thereof. In FIG. 1, only basic elements constituting the scanning electron microscope 100 are picked up and schematically shown.

The electron optical system is a mechanism that makes an electron beam 102 into a minute spot and scans the electron beam 102 on a sample 120, and includes an electron source, a focusing lens, an aperture, an objective lens, a deflector, and the like. Here, the electron optical system is represented by an electron source 101.

The stage mechanism system has a function of moving, rotating, and inclining the sample 120 to be inspected in a horizontal direction or a vertical direction while stably supporting the sample 120. Here, a sample stage 126 on which a sample is placed and a stage driving unit 125 having a function of inclining the sample stage 126 about a rotation axis T so that the electron beam 102 is incident on the sample 120 at a predetermined incident angle and a function of rotating the sample stage 126 about a rotation axis R perpendicular to a sample placement surface of the sample stage 126 are shown.

The detection system includes a detector that detects signal electrons generated when the sample 120 is irradiated with the electron beam 102. Here, a backscattered electron (BSE) detector 110a that detects BSE 103 and a secondary electron detector 110b that detects secondary electrons 104 are shown. In this embodiment, an example is shown in which the height of a foreign object is measured from an SEM image (charged particle image) based on the detected secondary electrons 104, but the invention is not limited thereto.

The control system controls the electron optical system, the stage mechanism system, and the detection system, detects the signal electrons, and generates the SEM image. Here, the control system is shown as a control unit 130 including an individual control unit that controls individual elements in the electron optical system, the stage mechanism system, and the detection system, and an overall control unit that sets operations of the individual elements so as to cause these individual elements to cooperate with each other to perform a desired operation.

The signal processing system performs image processing on the SEM image generated by the control system to measure the height of the foreign object. An image processing unit 131 executes the image processing for this purpose.

Functions of the overall control unit in the control units 130 and functions of the image processing unit 131 are executed by an information processing apparatus (computer) including an input device such as a keyboard and a pointing device and an output device such as a display. The information processing apparatus may be a single information processing apparatus, but a calculation load of the information processing apparatus may be distributed by connecting to a plurality of information processing apparatuses and data storage via a network.

First, a method for measuring a height of a foreign object 121 on the sample 120 such as a semiconductor wafer will be described. The SEM image obtained by irradiating the electron beam from directly above the sample 120 does not include information in the direction perpendicular to a sample surface. Therefore, in the present embodiment, as shown in FIG. 1, an image of the foreign object 121 is captured in a state where the sample stage 126 is inclined by a predetermined tilt angle by the stage driving unit 125. Subsequently, as shown in FIG. 2, a foreign object image 202 is extracted by performing the image processing on the SEM image 201. The foreign object image 202 can be extracted, for example, from a contour line extracted by binarizing the SEM image 201. The invention is not limited to this method, and any known method for extracting a foreign object image from an SEM image by the image processing may be applied. For example, a plurality of images may be registered in advance, and the foreign object image 202 may be extracted by matching. By inclining the sample 120 and capturing the image of the foreign object 121, the foreign object image 202 includes information about a bottom surface and a vertex or a top surface of the foreign object 121. Therefore, the height of the foreign object 121 is calculated using the information about the bottom surface and the vertex or the top surface in the foreign object image 202.

FIG. 3 shows a positional relation between the sample 120 and the electron beam (optical axis) 102 when the SEM image is captured. In a state in which the sample 120 is inclined about the rotation axis T extending in a Y direction, the SEM image is acquired by scanning a scanning range 200 by the electron beam 102. An angle defined by the electron beam (optical axis) 102 viewed from the Y direction when the SEM image is acquired and a surface of the sample 120 (an angle defined by the optical axis of the electron beam (optical axis) 102 and an X axis in FIG. 3) is referred to as an inclination angle $\alpha$ ($\alpha$<90°).

A method for calculating a height of a conical foreign object and a foreign object having a tapered cylindrical shape, which imitate a needle-like residue generated in etching processing will be described with reference to FIGS. 4A to 4B.

FIG. 4A is a diagram showing a bird's-eye view of the conical foreign object when the SEM image is acquired, and a foreign object image extracted from the SEM image. The height of the foreign object is set as H. In the foreign object image, two parallel straight lines are defined as inclination direction lines 210 extending in an inclination direction of the sample. In this example, since the foreign object is inclined in the X direction when the SEM image is acquired, the inclination direction line 210 is also a straight line extending in the X direction. The inclination direction line 210 on the foreign object image can be determined based on an inclination direction of the sample stage 126 and a scanning direction of the electron beam 102 by the electron optical system. Next, a line segment 221 where the inclination direction line 210 and a contour of the foreign object image are in contact with each other is extracted. As shown in the bird's-eye view, the line segment 221 is a line segment extending in the Y direction through a center of the bottom surface of the foreign object. Next, a line segment 222a and a line segment 222b that approximate the contour are extracted from both end points of the line segment 221, and an intersection point 223 thereof is obtained. A distance between the intersection point 223 and the line segment 221 is set as h. Here, the contour for extracting the approximate line segment is a contour located in an X+ direction with respect to the line segment 221. This is because the vertex of the foreign object is located on an X+ side of the line segment 221 as shown in the bird's-eye view. The line segment 221, the line segment 222a, the line segment 222b, and the intersection point 223 are in a relation shown in the bird's-eye view, and thus a height H of the foreign object is obtained as H=h/sin α.

FIG. 4B shows a bird's-eye view of the foreign object having a tapered cylindrical shape when the SEM image is acquired, and a foreign object image extracted from the SEM image. The height of the foreign object is set as H. Similarly, a line segment 231 where the inclination direction line 210 and a contour of the foreign object image are in contact with each other is extracted. As shown in the bird's-eye view, the line segment 231 is a line segment extending in the Y direction through a center of the bottom surface of the foreign object. Next, the line segment 232a and the line segment 232b that approximate the contour are extracted from both end points of the line segment 231, and a line segment 233 that intersects the line segment 232a and the line segment 232b, is parallel to the line segment 231, and is at the farthest position from the line segment 231 is obtained. A distance between the line segment 233 and the line segment 231 is set as h. Here, the contour for extracting the approximate line segment is a contour located in the X+ direction with respect to the line segment 231. This is because a line segment extending in a Y-axis direction through a center of a top surface of the foreign object is located on an X+ side of the line segment 231 as shown in the bird's-eye view. The line segment 231, the line segment 232a, the line segment 232b, and the line segment 233 are in a relation shown in the bird's-eye view, and thus the height H of the foreign object is obtained as H=h/sin α.

Although the shapes of the foreign objects shown in FIGS. 4A to 4B are relatively simple shapes, when the foreign object has a complicated shape, there is a possibility that there are a plurality of inclination direction lines in contact with the contour of the foreign object image. In this case, the longest line segment among the line segments connecting contact points with the inclination direction line is extracted as a line segment indicating a bottom surface position.

Since the shapes of the foreign objects shown in FIGS. 4A to 4B showing the method for calculating the height of the foreign object are axially symmetrical, a shape viewed from a side surface does not change in any direction. In this case, since the same foreign object image can be obtained even when the sample is inclined in any direction, the calculation accuracy of the height of the foreign object does not change. However, the foreign object generated in the etching processing is often not axially symmetrical, for example, such as having a distorted bottom surface (such as an ellipse) or inclined side surfaces. In this case, the obtained foreign object image changes depending on the shape of the foreign object and an orientation in which the sample is inclined, and the calculation accuracy changes.

Hence, the orientation of the foreign object is defined based on the inclination direction line described above (first definition). The first definition of the orientation of the foreign object will be described using FIG. 5. The residue generated in the etching processing basically has a tapered conical shape or a cylindrical shape. Therefore, the foreign object image has a shape extending in the X+ direction. Since the longest line segment 241 connecting the contact points between the inclination direction line 210 and the contour of the foreign object image is a line segment crossing the bottom surface of the foreign object, an orientation facing the line segment 241 is defined as a front surface of the foreign object. Here, a reference line 240 orthogonal to the inclination direction line 210 is defined, and an angle β defined by the line segment 241 and the reference line 240 is defined as the orientation of the foreign object (first definition). When the foreign object has an axially symmetrical shape, it is always that the orientation β=0, but when the foreign object has no axially symmetrical shape, the orientation β takes various values, and the value of the height H calculated according to the orientation β varies.

FIG. 6 shows a dependence of a calculated value of the height H of the foreign object on the orientation of the foreign object. A horizontal axis represents the orientation β (deg), and a vertical axis represents a ratio of the calculated value of the height H when the orientation is a predetermined value to the calculated value of the height H when the orientation β=0. FIG. 6 is a graph based on actual measurement values when the foreign object has a predetermined shape. Although the value of the graph changes depending on the shape of the foreign object, the ratio of the calculated values has the minimum value at the orientation β=0, and there is no change in a tendency that the ratio of the calculated value increases as a deviation from the orientation β=0 increases. As can be seen from the graph of FIG. 6, in the vicinity of the orientation β=0, a deviation of the calculated height H of the foreign object is prevented to be relatively small. Here, in the measurement of the height of the foreign object in the present embodiment, it is possible to set an acceptable error for a user to calculate the height H. When the acceptable error is exceeded, the orientation of the inclination is changed, specifically, the sample stage 126 is rotated by the stage driving unit 125 to perform the re-measurement, or the user is notified that the acceptable error is exceeded as an alarm. As described above, the graph of FIG. 6 depends on the shape of the foreign object. Therefore, the image processing unit 131 creates dependence data of the calculated value of the height H of the foreign object on the orientation β of the foreign object by actual measurement or simulation for a typical example of a shape of an assumed foreign object, and stores the dependence data. Based on the stored dependence data, the image processing unit 131 can determine a magnitude (±ε deg or less) of the β acceptable according to the shape of the foreign object, and can correct the height H of the foreign object calculated from the distance h and the inclination angle α according to the magnitude of the orientation β of the foreign object, specifically, convert the height H of the foreign object into an estimated value in the case of the orientation β=0, and output the estimated value as a measurement value.

FIG. 7 shows a flowchart for measuring the height of the foreign object. The entire flowchart is executed by the control unit 130. First, a measurement acceptable error of the height of the foreign object is set (S01). As will be described below, the user can set the acceptable error on a GUI screen. Next, the charged particle image of the foreign object at a predetermined rotation and inclination angle is acquired (S02). An initial rotation angle and the tilt angle of the sample stage 126 are freely set by the user. The foreign object image is extracted from the charged particle image (S03), and as explained in FIG. 5, the angle β between the reference line and the line segment connecting lateral end points of the contour of the foreign object image is calculated (S04). Hereinafter, a direction in which the inclination direction line 210 extends may be referred to as a vertical direction, and a direction orthogonal to the inclination direction line 210 may be referred to as a lateral direction.

Whether the orientation β of the foreign object satisfies an acceptable error range is determined (S05). As shown in FIG. 6, the image processing unit 131 can obtain an acceptable orientation range (0±ε [deg]) from the dependence data and the set acceptable error of the foreign object in advance, and can determine whether the orientation β of the foreign object satisfies the acceptable error range by comparing the orientation β obtained in step S04 and a magnitude of the acceptable orientation E.

When the orientation β of the foreign object satisfies the acceptable error range, the distance h between the bottom surface and the vertex or the top surface of the foreign object image is measured (S06), and the height H of the foreign object is calculated based on the distance h and the inclination angle α (S07). In this case, when the orientation β of the foreign object is not 0, the height H of the foreign object may be converted into the value in the case of β=0 using the dependence data (see FIG. 6) of the height H of the foreign object on the orientation of the foreign object to obtain the measurement value of the height H of the foreign object. In contrast, when the orientation β of the foreign object does not satisfy the acceptable error range, it is determined whether to perform re-measurement (S08), and when the re-measurement is performed, a rotation angle of the sample stage 126 is changed (S09), and the charged particle image is acquired again (S02). When the re-measurement is not performed, similarly, the height H of the foreign object is calculated (S06, S07), and a measurement result of the height H and reliability of the measurement are output (S10). As information on the reliability of the measurement, it is considered that a warning is given to the effect that the height of the foreign object is calculated in a state in which the acceptable error is exceeded. Accordingly, the user can evaluate the measurement result including the reliability thereof.

Here, when the orientation β of the foreign object does not satisfy the acceptable error range and the rotation angle of the sample stage 126 is changed (S09), it is desirable that the image processing unit 131 calculates a desirable rotation angle. Further, even when the orientation β of the foreign object satisfies the acceptable error range, depending on the shape of the foreign object, there may be another orientation in which the measurement error becomes small. For example, it is assumed that the bottom surface of the foreign object is elliptical. In this case, as shown in FIG. 8A, there are cases in which the bottom surface 250 is positioned vertically long (case A) to the inclination direction line 210 and in which the bottom surface 250 is positioned horizontally long (case B), and in each case, an orientation that satisfies the acceptable error range based on the orientation β of the foreign object can be obtained. However, according to a study of the inventors, the height H of the foreign object calculated in the horizontally long (case B) state can be expected to have higher accuracy than the height H of the foreign object calculated in the vertically long (case A) state.

Hence, an orientation of the foreign object based on all shapes of the foreign object image is defined (second definition). In this case, an orientation in which the height of the foreign object can be expected to be calculated with high accuracy is defined as the front surface of the foreign object. The second definition of the orientation of the foreign object will be described using FIG. 8B. The foreign object image is approximated to an ellipse, and a first axis 261 and a second axis 262 of an approximate ellipse 260 are obtained. Here, the first axis 261 is an axis that intersects the reference line 240 at an acute angle, and the second axis 262 is an axis that intersects the reference line 240 at an obtuse angle. In the second definition of the orientation of the foreign object, an angle γ between a major axis of the approximate ellipse 260 and the reference line 240 is defined as the orientation of the foreign object. In this example, as shown in FIG. 8B, the angle γ is an angle defined by the first axis 261 and the reference line 240.

In addition, an aspect ratio of the foreign object image is defined using the approximate ellipse 260. As shown in the drawing, a length of the first axis 261 is set as a, and a length of the second axis 262 is set as b. (b/a) defined based on the approximate ellipse is set as the aspect ratio of the foreign object image. In this example, since the first axis 261 is a major axis of the ellipse and the second axis 262 is a minor axis of the ellipse, the aspect ratio (b/a) of the foreign object image is smaller than 1, which corresponds to the horizontally long (case B) state in FIG. 8A. In contrast, a case where the aspect ratio (b/a) of the foreign object image is greater than 1 corresponds to the vertically long (case A) state in FIG. 8A.

FIG. 9 shows a flowchart for measuring the height of the foreign object. This flowchart includes a flow of determining the orientation of the foreign object and performing the re-measurement so as to correspond to various shapes of the foreign object. The entire flowchart is executed by the control unit 130. The same steps as those in the measurement flowchart of FIG. 7 are denoted by the same reference numerals, and redundant descriptions thereof are omitted.

Steps S01 to S05 are the same as the measurement flowchart of FIG. 7. In step S05, it is determined whether the acceptable error range is satisfied based on the orientation β of the foreign object, and thus it is indicated that the orientation of the foreign object is determined according to the first definition in the flowchart.

As shown in FIG. 8B, the foreign object image approximates an ellipse, and the length a of the first axis and the length b of the second axis of the approximate ellipse are obtained in advance (S11), and when the determination of the orientation of the foreign object according to the first definition is within the acceptable error range, the aspect ratio (b/a) of the foreign object image is determined (S12). When the aspect ratio (b/a) of the foreign object image is 1 or less, the foreign object is horizontally long, and the measurement method of the present embodiment can be expected to calculate the height H of the foreign object with higher accuracy. In this case, the height H of the foreign object is calculated (S06, S07), and the measurement result of the height of the foreign object is output (S13).

In contrast, when the aspect ratio (b/a) of the foreign object image is greater than 1, the foreign object is vertically long, and the height H of the foreign object calculated by the measurement method of the present embodiment may be inferior in accuracy. In this case, the sample stage 126 is rotated by 90° (S19), the charged particle image is acquired again (S02), and the height H of the foreign object is calculated based on the charged particle image acquired again. When it is determined that the aspect ratio (b/a) of the obtained foreign object image is greater than 1 despite the re-imaging by rotating the sample stage 126 by 90°, it is considered that the accuracy of the height H of the foreign object calculated from each of the foreign object images before and after the rotation is substantially the same. Therefore, the height H of the foreign object may be calculated from each of the foreign object images before and after the rotation, and the measurement result of the height H of the foreign object may be obtained based on an average value (S20).

Meanwhile, when it is determined that the acceptable error range is not satisfied in the determination of the orientation of the foreign object according to the first definition, as shown in FIG. 8B, the angle γ defined by the major axis of the approximate ellipse and the reference line is calculated (S14). Thereafter, whether the orientation γ of the foreign object according to the second definition satisfies the acceptable error range is determined (S15). As shown in FIG. 6, the image processing unit 131 can obtain the acceptable orientation range (0±ε [deg]) from the dependence data and the set acceptable error of the foreign object in advance, and can determine whether the orientation γ of the foreign object satisfies the acceptable error range by comparing the orientation γ obtained in step S14 and the magnitude of the acceptable orientation ε. When the orientation γ of the foreign object according to the second definition satisfies the acceptable error range, it is considered that there is a low possibility that the calculation accuracy of the height H of the foreign object is improved even when the orientation of the foreign object is changed by rotating the sample stage 126. Therefore, the height H of the foreign object is calculated without performing the re-measurement (S06, S07), and the measurement result of the height H is output (S10).

In contrast, when the orientation γ of the foreign object according to the second definition does not satisfy the acceptable error range, it is determined whether to perform the re-measurement (S16), and when the re-measurement is performed, the sample stage 126 is rotated by −γ° (S17), and the charged particle image is acquired again (S02). Accordingly, since the charged particle image can be acquired in a state where the front surface of the foreign object according to the second definition faces the reference line, the calculated value of the height of the foreign object with higher accuracy can be obtained. When the re-measurement is not performed, the height H of the foreign object is calculated (S06, S07).

The re-measurement may be performed normally without performing the determination according to the second definition (S15). In step S13, it is desirable to output not only the measurement result of the height of the foreign object but also the reliability of the measurement in the same manner as the measurement flowchart of FIG. 7.

FIG. 10 shows an example of the GUI screen for setting measurement conditions of the scanning electron microscope 100. The GUI screen is displayed on the output device included in the information processing apparatus. A measurement condition setting screen 300 includes an apparatus condition setting portion 310 for setting the measurement conditions of the scanning electron microscope 100, a measurement content setting portion 320 for setting a measurement content, an acceptable error setting portion 330 for setting the measurement acceptable error, and a re-measurement necessity setting portion 340 for setting necessity of the re-measurement. The apparatus condition setting portion 310 includes a tilt angle setting portion 311 for setting the tilt angle of the sample stage 126 and a rotation angle setting portion 312 for setting the initial rotation angle of the sample stage 126. The charged particle image of the foreign object is acquired by the tilt angle or the initial rotation angle set by these portions. In the measurement content setting portion 320, the content for measuring the sample is determined. Those in addition to the height H of the foreign object can be measured. Whether the orientation of the foreign object satisfies the acceptable error range is determined based on a value set in the acceptable error setting portion 330. When the re-measurement necessity setting portion 340 is set to yes, the re-measurement is executed when the orientation of the foreign object does not satisfy the acceptable error range, and when the re-measurement necessity setting portion 340 is set to no, the re-imaging of the charged particle beam image obtained by rotating the sample stage 126 is not performed. The measurement conditions set on the measurement condition setting screen 300 are confirmed by pressing a determination button 350.

FIG. 11 is an example of a data structure of measurement data showing the measurement result of the scanning electron microscope 100. The measurement data is stored in a storage device of the information processing apparatus. Each record of measurement data 400 indicates a measurement result regarding the foreign object extracted from the captured charged particle image (SEM image). A file name for identifying the SEM image is registered in an image list column 401. In this example, the image list column 401 includes three measurement item columns of height, orientation, and area of the foreign object. In a height column 402, the height H (calculated value) of the foreign object calculated based on the distance h and the inclination angle α is registered, in an orientation column 403, the orientation of the foreign object used in calculating the height is registered, and in an area column 404, an area of the foreign object (may be an area of the approximate ellipse) is registered. In a measurement reliability column 405, the measurement reliability determined by whether the orientation of the foreign object satisfies the acceptable error range is registered. When the orientation of the foreign object satisfies the acceptable error range, the measurement reliability is registered as HIGH, and when the orientation of the foreign object does not satisfy the acceptable error range, the measurement reliability is registered as LOW. In an estimated value column 406, the height of the foreign object corrected based on the dependence data is registered. A value of the estimated value column 406 is treated as the measurement value. In a note column 407, a special note or the like generated at the time of measurement is registered.

In order to display the measurement result of the scanning electron microscope 100 to the user, the measurement data of FIG. 11 may be displayed as a table, or occurrence of an abnormality and a position where the abnormality is detected may be displayed in association with each other as the wafer heat map as shown in FIG. 12, which is useful for grasping the abnormality. For example, a wafer 501 is divided into a plurality of sections 502, and information indicating whether a frequency of occurrence of a foreign object having a predetermined height or more for each section is equal to or greater than a reference value is displayed.

The invention is not limited to the above-described embodiments, and includes various modifications. For example, the embodiments described above have been described in detail to facilitate understanding of the invention, and the invention is not necessarily limited to those including all the configurations described above. A part of a configuration according to one embodiment can be replaced with a configuration according to another embodiment, and a configuration according to one embodiment can also be added to a configuration according to another embodiment. A part of the configuration of each embodiment may be added to, deleted from, or replaced with another configuration. For example, in order to detect the orientation of the foreign object, the image processing unit 131 may store a classification learning device in which learning is performed in advance by using training data in which a plurality of charged particle images captured by changing the orientation of the foreign object and the orientation of the foreign object of the charged particle image are set as a set, and detect the orientation of the foreign object from the foreign object image using the classification learning device.

REFERENCE SIGNS LIST

100: scanning electron microscope
101: electron source
102: electron beam
103: backscattered electron
104: secondary electron
110*a*: BSE detector
110*b*: secondary electron detector
120: sample
121: foreign object
125: stage driving unit
126: sample stage
130: control unit
131: image processing unit
200: scanning range
201: SEM image
202: foreign object image
210: inclination direction line
221, 222*a*, 222*b*: line segment
223: intersection point
231, 232*a*, 232*b*, 233: line segment
240: reference line
241: line segment
250: bottom surface
260: approximate ellipse
261: first axis
262: second axis
300: measurement condition setting screen
310: apparatus condition setting portion
311: tilt angle setting portion
312: rotation angle setting portion
320: measurement content setting portion
330: acceptable error setting portion
340: re-measurement necessity setting portion
350: determination button
400: measurement data
401: image list column
402: height column
403: orientation column
404: area column
405: measurement reliability column
406: estimated value column
407: note column
500: wafer heat map
501: wafer
502: section

The invention claimed is:

1. A foreign object height measurement method for measuring a height of a foreign object on a sample from a charged particle image acquired by irradiating the sample with a charged particle beam in a state where a sample stage on which the sample is placed is inclined, the measurement method comprising:

storing in advance dependence data indicating a dependence of a calculated value of the height of the foreign object calculated from a foreign object image, which is an image of the foreign object extracted from the charged particle image, on an orientation of the foreign object;

extracting a measurement target foreign object image, which is an image of a measurement target foreign object, from the charged particle image; and outputting a measurement value of a height of the measurement target foreign object along with a warning regarding reliability or measuring the height of the measurement target foreign object from a charged particle image acquired by rotating the sample stage and changing an orientation of the measurement target foreign object detected from the measurement target foreign object image when it is determined that the orientation of the measurement target foreign object does not satisfy an acceptable error range based on the dependence data, wherein the orientation of the foreign object is defined by an angle defined by a longest line segment among line segments that connect contact points between a contour of the foreign object image and inclination direction lines, which are two parallel straight lines extending in an inclination direction of the sample stage, and a reference line perpendicular to the inclination direction lines.

2. The foreign object height measurement method according to claim 1, wherein a ratio of a calculated value of the height of the foreign object when the orientation of the foreign object is a predetermined value to a calculated value of the height of the foreign object when the orientation of the foreign object is 0 is stored as the dependence data, and a value obtained by converting, based on the detected orientation of the measurement target foreign object and the dependence data, a calculated value of the height of the measurement target foreign object image calculated from the measurement target foreign object image into a calculated value of the height of the measurement target foreign object when the orientation of the measurement target foreign object is 0 is output as a measurement value of the height of the measurement target foreign object.

3. The foreign object height measurement method according to claim 2, wherein the calculated value of the height of the measurement target foreign object is obtained based on a distance between a longest line segment among line segments that connect contact points between a contour of the measurement target foreign object image and the inclination direction lines and a vertex or a top surface of the measurement target foreign object determined based on an approximate line segment that approximates the contour of the measurement target foreign object image extending in the inclination direction of the sample stage from each of the contact points, which are end points of the line segments, and an inclination angle which is an angle defined by a surface of the sample and an optical axis of the charged particle beam.

4. The foreign object height measurement method according to claim 1, wherein with respect to two axes of an approximate ellipse obtained by ellipse approximation of the measurement target foreign object image, when the axis intersecting with the reference line at an acute angle is defined as a first axis and the other axis is defined as a second axis, when it is determined that the orientation of the measurement target foreign object detected from the measurement target foreign object image satisfies the acceptable error range based on the dependence data and a length of the second axis to a length of the first axis exceeds 1, the height of the measurement target foreign object is measured from the charged particle image acquired by rotating the sample stage by 90° and changing the orientation of the measurement target foreign object.

5. The foreign object height measurement method according to claim 1, wherein when it is determined that the orientation of the measurement target foreign object detected from the measurement target foreign object image does not satisfy the acceptable error range based on the dependence data, the height of the measurement target foreign object is measured from the charged particle image acquired by rotating the sample stage and changing the orientation of the measurement target foreign object according to an angle defined by the reference line and a major axis of an approximate ellipse obtained by ellipse approximation of the measurement target foreign object image.

6. The foreign object height measurement method according to claim 1, wherein
a measurement result of the height of the foreign object on the sample is displayed in association with a measurement position of the sample.

7. The foreign object height measurement method according to claim 1, wherein
a classification learning device in which learning is performed in advance by using training data in which a plurality of the charged particle images captured by changing the orientation of the foreign object and the orientation of the foreign object of the charged particle image are set as a set is stored, and
the orientation of the measurement target foreign object is detected from the measurement target foreign object image using the classification learning device.

8. The foreign object height measurement method according to claim 1, wherein
the foreign object is an etching residue.

9. A charged particle beam device comprising:
a sample stage on which a sample is placed and which is capable of rotating and inclining;
a charged particle optical system configured to irradiate the sample with a charged particle beam;
a detection system configured to detect a signal electron generated by irradiating the sample with the charged particle beam;
a control unit configured to control the sample stage, the charged particle optical system, and the detection system and acquire a charged particle image based on the signal electron detected by the detection system; and
an image processing unit configured to measure a height of a foreign object on the sample from the charged particle image, wherein
the image processing unit is configured to store in advance dependence data indicating a dependence of a calculated value of a height of a foreign object calculated from a foreign object image, which is an image of the foreign object extracted from the charged particle image, on an orientation of the foreign object,
the image processing unit is configured to extract a measurement target foreign object image, which is an image of a measurement target foreign object, from the charged particle image and output a measurement value of a height of the measurement target foreign object along with a warning regarding reliability or measuring the height of the measurement target foreign object from a charged particle image acquired by rotating the sample stage and changing an orientation of the measurement target foreign object detected from the measurement target foreign object image when it is determined that the orientation of the measurement target foreign object does not satisfy an acceptable error range based on the dependence data, and
the orientation of the foreign object is defined by an angle defined by a longest line segment among line segments that connect contact points between a contour of the foreign object image and inclination direction lines, which are two parallel straight lines extending in an inclination direction of the sample stage, and a reference line perpendicular to the inclination direction lines.

10. The charged particle beam device according to claim 9, wherein
the image processing unit is configured to store a ratio of a calculated value of the height of the foreign object when the orientation of the foreign object is a predetermined value to a calculated value of the height of the foreign object when the orientation of the foreign object is 0 as the dependence data, and
the image processing unit is configured to output, as a measurement value of the height of the measurement target foreign object, a value obtained by converting, based on the detected orientation of the measurement target foreign object and the dependence data, a calculated value of the height of the measurement target foreign object image calculated from the measurement target foreign object image into a calculated value of the height of the measurement target foreign object when the orientation of the measurement target foreign object is 0.

11. The charged particle beam device according to claim 10, wherein
the image processing unit is configured to obtain the calculated value of the height of the measurement target foreign object based on a distance between a longest line segment among line segments that connect contact points between a contour of the measurement target foreign object image and the inclination direction lines and a vertex or a top surface of the measurement target foreign object determined based on an approximate line segment that approximates the contour of the measurement target foreign object image extending in the inclination direction of the sample stage from each of the contact points, which are end points of the line segments, and an inclination angle which is an angle defined by a surface of the sample and an optical axis of the charged particle beam.

12. The charged particle beam device according to claim 9, wherein
with respect to two axes of an approximate ellipse obtained by ellipse approximation of the measurement target foreign object image, when the axis intersecting with the reference line at an acute angle is defined as a first axis and the other axis is defined as a second axis,
when it is determined that the orientation of the measurement target foreign object detected from the measurement target foreign object image satisfies the acceptable error range based on the dependence data and a length of the second axis to a length of the first axis exceeds 1, the image processing unit measures the height of the measurement target foreign object from the charged particle image acquired by rotating the sample stage by 90° and changing the orientation of the measurement target foreign object.

13. The charged particle beam device according to claim 9, wherein
when it is determined that the orientation of the measurement target foreign object detected from the measurement target foreign object image does not satisfy the acceptable error range based on the dependence data, the image processing unit measures the height of the measurement target foreign object from the charged particle image acquired by rotating the sample stage and changing the orientation of the measurement target foreign object according to an angle defined by the reference line and a major axis of an approximate ellipse obtained by ellipse approximation of the measurement target foreign object image.

14. The charged particle beam device according to claim 9, wherein the image processing unit is configured to display a measurement result of the height of the foreign object on the sample in association with a measurement position of the sample.

15. The charged particle beam device according to claim 9, wherein the image processing unit is configured to store a classification learning device in which learning is performed in advance by using training data in which a plurality of the charged particle images captured by changing the orientation of the foreign object and the orientation of the foreign object of the charged particle image are set as a set, and the image processing unit is configured to detect the orientation of the measurement target foreign object from the measurement target foreign object image using the classification learning device.

* * * * *